US008213417B2

(12) United States Patent
Hernandez-Mondragon et al.

(10) Patent No.: US 8,213,417 B2
(45) Date of Patent: *Jul. 3, 2012

(54) SYSTEM, APPARATUS, AND METHODS FOR PROACTIVE ALLOCATION OF WIRELESS COMMUNICATION RESOURCES

(75) Inventors: Edwin A. Hernandez-Mondragon, Coral Springs, FL (US); Abdelsalam A. Helal, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,185

(22) Filed: Mar. 5, 2010

(65) Prior Publication Data

US 2010/0157947 A1 Jun. 24, 2010

Related U.S. Application Data

(63) Continuation of application No. 10/909,818, filed on Aug. 2, 2004, now Pat. No. 7,697,508.

(60) Provisional application No. 60/491,436, filed on Jul. 31, 2003.

(51) Int. Cl.
*H04L 12/66* (2006.01)
(52) U.S. Cl. ...... 370/352; 370/329; 370/328; 455/432.1
(58) Field of Classification Search ................... 370/352, 370/329, 328, 238, 235, 401, 351; 455/432.1, 455/433, 439; 709/239
See application file for complete search history.

(56) References Cited

U.S. PATENT DOCUMENTS

| 6,372,057 | B1 | 4/2002 | Fugimura et al. |
| 6,628,943 | B1* | 9/2003 | Agrawal et al. ............ 455/432.1 |
| 6,684,256 | B1* | 1/2004 | Warrier et al. ................ 709/238 |
| 6,963,582 | B1* | 11/2005 | Xu ................................ 370/466 |
| 6,973,057 | B1* | 12/2005 | Forslow ........................ 370/328 |
| 7,020,087 | B2* | 3/2006 | Steinberg et al. ............ 370/238 |
| 7,697,508 | B2* | 4/2010 | Hernandez-Mondragon et al. ............................. 370/352 |
| 2003/0016655 | A1* | 1/2003 | Gwon .......................... 370/352 |
| 2003/0018810 | A1* | 1/2003 | Karagiannis et al. ......... 709/238 |
| 2004/0017310 | A1* | 1/2004 | Vargas-Hurlston et al. ........................ 342/357.1 |
| 2004/0120294 | A1* | 6/2004 | Yang et al. ................... 370/338 |
| 2004/0136337 | A1* | 7/2004 | Warrier et al. ............... 370/328 |
| 2006/0104214 | A1* | 5/2006 | Borella ......................... 370/252 |
| 2007/0198835 | A1* | 8/2007 | Mudhar ....................... 713/171 |

OTHER PUBLICATIONS

Perkins, C.E., "IP Mobility Support," Request for Comments 2002, IBS, Oct. 1996.
Johnson, D., et al., "Mobility Support in IPv6", Proc. of MOBICOM 1996, Nov. 1996.

(Continued)

*Primary Examiner* — Minh D Dao
(74) *Attorney, Agent, or Firm* — Thomas, Kayden, Horstemeyer & Risley, LLP

(57) ABSTRACT

A system for communication between a mobile node and a communications network is provided for use with a communications network having one or more communications network nodes that define a foreign agents and that communicate with the mobile node in a predefined region. The system includes a ghost-foreign agent that advertises a foreign agent so that the mobile node is aware of the foreign agent when the mobile node is located outside the predefined region. The system further includes a ghost-mobile node that signals the foreign agent in response to the foreign agent advertising and based upon a predicted future state of the mobile node.

8 Claims, 6 Drawing Sheets

OTHER PUBLICATIONS

Hernandez, E., et al., "Ramon: Rapid Mobility Network Emulator," Proc. of 27th IEEE Conf. on Local Computer Networks (LCN), Nov. 2002.

Hernandez, E., et al., "Examining Mobile-IP Performance in Rapidly Mobile Environments: the case of a Computer Train", IEEE Conf. in LCN, Nov. 2001.

Liu, T., et al, "Mobility Modeling, Location Tracking & Trajectory Prediction in Wireless ATM Networks", IEEE J. Spec. Areas in Comm., vol. 16, No. 6, pp. 922-936, Aug. 1998.

Rezaiifar, R., et al., "Stochastic Control of Handoffs in Cellular Networks," IEEE J. Spec. Areas in Comm., vol. 16, No. 6, pp. 1348-1362, Sep. 1995.

Levine, D., et al., "Shadow Cluster Concept for Resource Allocation & Call Admission in ATM-based Wireless Networks", Proc. of MOBICOM 1995, pp. 142-150, 1995.

Ramjee, R., et al., "Hawaii: A Domain-Based Approach for Supporting Mobility in Wide-Area Wireless Networks", Int'l Conf. on Network Protocols ICNP'99, Oct. 1999.

Valko, A.G., "Cellular IP—A New Approach to Internet Host Mobility", ACM Comp. Comm. Review, vol. 29, No. 1, pp. 50-65, Jan. 1999.

Su, W., et al., "Mobility Prediction in Wireless Networks", Proc. of IEEE MILCOM 2000, 2000.

Ko, Y.B., et al., "Location-Aided Routing (LAR) in Mobile Ad-Hoc Networks", Proc. of MOBICOM 1998, pp. 66-75, 1998.

Ergen, M., et al., "Fast Handoff with GPS Routing for Mobile IP", IPCN 2002, Apr. 2002.

Navas, J., et al., "GeoCast-Geographic Addressing & Routing", Proc. MOBICOM 1997, pp. 66-76, Sep. 1997.

Holland, G., et al., "Analysis of TCP Performance over Mobile Ad-Hoc Networks", Proc. of MOBICOM 1999, pp. 219-230, 1999.

Gerla, M., et al., "Tree Multicast Strategies in Mobile, Multihop Wireless Networks", Mobile Networks & Apps., vol. 4, No. 3, pp. 193-207, Oct. 1999.

Fladenmuller, A., et al., "The Effect of Mobile IP Handoffs on the Performance of TCP", Mobile Networks & Apps., vol. 4, No. 2, pp. 131-135, May 1999.

Caceres, R., et al., "Improving the Perf. of Reliable Transport Protocols in Mobile Computing Envir.", IEEE J. of S. Areas of Comm., vol. 13, No. 5, pp. 850-857, Nov. 1996.

Caceres, R., et al., "Fast & Scalable Handoffs for Wireless Internetworks", Proc. of MOBICOM 1996, pp. 56-66, Nov. 1996.

Balakrishnan, H., et al., "Improving Reliable Transport & Handoff Performance in Cellular Wireless Networks", ACN Wireless Networks, vol. 1, No. 4, Dec. 1995.

Balakrishnan, H., et al., "A Comparison of Mechanisms for Improving TCP Performance over Wireless Links", Proc. of ACM SIGCOMM, Aug. 1996.

Forsberg, D., et al., "Distributing Mobility Agents Hierarchically Under Frequent Location Updates", 6th IEEE MOMUC'99, 1999.

Forsberg, G., et al., "Dynamics—HUT Mobile IP Technical Document", Internet Draft Submission, Helsinki Univ. of Tech., Aug. 3, 1999.

El Malki, K., et al, "Low Latency Handoff in Mobile IPv4", Internet Draft Submission, CISCO, Jul. 2001.

Dailey, D., et al., "An Algorithm & Implementation to Predict the Arrival of Transit Vehicles", IEEE ITSC'99, Oct. 1999.

Welch, G., et al., "An Introduction to the Kalman Filter", Univ. North Carolina TR 95-041, 2002 (updated Apr. 5, 2004).

Pack, S., et al., "Fast Inter-AP Handoff Using Predictive Authentication Scheme in a Public Wireless LAN", submitted to World Scientific, Jun. 10, 2002.

"Implementing Multiple SSIDs", Wi-Fi Planet, Apr. 24, 2003.

"All Aboard for Canadian Wi-Fi", Wi-Fi Planet, Jul. 10, 2003.

Ayyagari, A., et al., "Making IEEE 802.11 Networks Enterprise-Ready", Microsoft Corp., May 2001.

* cited by examiner

Foreign Agent 260

Foreign Agent 265

Foreign Agent 280

Foreign Agent 270

Foreign Agent 275

| 0 | | | | | | | | | 1 | | | | | | | | | | 2 | | | | | | | | | | 3 | | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | S | B | D | M | G | V | rsv | | | | | | Lifetime | | | | | | | | | | | |
| Home Address | | | | | | | | | | | | | | | | | | | | | | | | | | | | | | | |
| Home Agent | | | | | | | | | | | | | | | | | | | | | | | | | | | | | | | |
| Care-of Address | | | | | | | | | | | | | | | | | | | | | | | | | | | | | | | |
| Identification | | | | | | | | | | | | | | | | | | | | | | | | | | | | | | | |
| Extensions | | | | | | | | | | | | | | | | | | | | | | | | | | | | | | | |

FIG. 4

| 0 | | | | | | | | | 1 | | | | | | | | | | 2 | | | | | | | | | | 3 | | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | Length | | | | | | | | Sequence Number | | | | | | | | | | | | | | | |
| Registration Lifetime | | | | | | | | | | | | | | | | R | B | H | F | M | G | V | reserved | | | | | | | | |
| Zero or more Care-of Addresses • • • | | | | | | | | | | | | | | | | | | | | | | | | | | | | | | | |

SYSTEM, APPARATUS, AND METHODS FOR PROACTIVE ALLOCATION OF WIRELESS COMMUNICATION RESOURCES

CROSS REFERENCE TO RELATED APPLICATION

This application is a continuation of U.S. application Ser. No. 10/909,818, filed Aug. 2, 2004, which claims the benefit of U.S. Provisional Application No. 60/491,436, filed in the United States Patent and Trademark Office on Jul. 31, 2003, the entirety of which is incorporated herein by reference.

BACKGROUND

1. Field of the Invention

This invention relates to the field of communications, and, more particularly, to allocation of resources of a communications network for supporting wireless communications.

2. Description of the Related Art

Mobile communications broadly encompass the various devices and techniques that enable individuals to communicate without having to rely on a static network infrastructure. Laptop computers, palmtops, personal digital assistants (PDAs), and cellular phones are all part of the growing array of computing and telephony-based mobile devices that can be used to exchange voice signals and digitally encoded data from remote locations. The general architecture for mobile systems entails mobile nodes, or hosts, communicating with one another through a series of base stations that serve distinct zones or cells. According to this architecture, a mobile node remains in contact with a communication network by repeatedly tearing down old connections and establishing new connections with a new base station as the host moves from one cell to another.

What is generally needed for such architectures to function adequately is some way for the mobile node to let other nodes know where the mobile node can be reached while the host is moving or located away from home. In accordance with a typical mobile networking protocol, a mobile node registers with a home agent so that the home agent can remain a contact point for other nodes that wish to exchange messages or otherwise communicate with the mobile node as it moves from one location to another. An example of such a protocol is Mobile Internet Protocol (Mobile IP). Mobile IP allows a mobile node to use two IP addresses, one being a fixed home address and the other being a care-of address. The care-of address changes as the mobile node moves between networks thereby changing its point of attachment to a network. When the mobile node links to a network other than one in which the home agent resides, the mobile node is said to have linked to a foreign network. The home network provides the mobile node with an IP address and once the node moves to a foreign network and establishes a point of attachment, the mobile node receives a care-of address assigned by the foreign network.

Mobile IP v. 4 depends on the interaction between a home agent and foreign agents, the foreign agents serving as wireless access points distributed throughout a coverage area of a network or an interconnection of multiple networks. This architecture, however, does have disadvantages. These have led to assorted proposals for enhancing the capabilities of Mobile IP. One such proposal is to use a hierarchy of foreign agents intended to reduce the number of registrations required for the mobile node.

FIG. 1 is a schematic diagram illustrating an exemplary architecture for a mobile communications system 100 using hierarchical foreign agents as is known in the art. As shown, the system 100 can include a home agent 105 and a foreign agent 110, each communicatively linked via a communications network 115 such as the Internet. The foreign agent 110 further is communicatively linked with the hierarchy of foreign agents 120, 125, 130, 135, 140, and 145. Accordingly, a mobile host 150 can choose a foreign agent which is closer than the others as a registration point. Registration messages are constrained to that region only.

The mobile node 150 travels in range of foreign agent 145. The mobile node 150 registers with foreign agent 145, foreign agent 125, and foreign agent 110 as the mobile node's 150 care-of addresses. A registration request also reaches the home agent 105. The registration reply reaches the mobile node 150 via the reverse path. Accordingly, packets received at the home agent 105 that are to be routed to the mobile node 150 can be tunneled to foreign agent 110, which tunnels the packets to foreign agent 125, and finally to foreign agent 145 prior to transmitting the packets to the mobile node 150.

Nevertheless, registration delays and associated information losses can still represent significant obstacles for wireless communications involving a mobile node. This stems mainly from the inevitable delay associated with the setting up of a new communication link each time the mobile node is handed off from one foreign agent to another. The setup requires time for the network to negotiate protocol details, establish communication rates, and decide the applicable error-handling approaches to be employed. These should each be resolved as a prelude to establishing the actual connection for the exchange of data. With conventional systems and devices, the setting up typically must await the arrival of the mobile node in the predefined region of coverage for the foreign agent to which the mobile node is to be handed off. Depending upon the mobile network configuration, the time required for registration can rival the time in which the mobile node dwells within a given cell coverage area. Moreover, data packets may be lost if they arrive for the mobile node during the time in which the setup is being worked out.

SUMMARY OF THE INVENTION

The present invention provides a preemptive and predictive solution for communications in wireless communications networks. More particularly, the present invention provides two different types of ghost-entities that can be used individually or jointly in setting up a wireless connection between a mobile node and a foreign agent. The ghost entities can act on behalf of a wireless node and a foreign agent. They can determine and use predicted information to improve the performance of wireless communications, especially those involving a mobile node moving at moderate or high speeds. As explained herein, the ghost entities cause communication network resources to be allocated proactively rather than reactively.

One aspect of the present invention pertains to a wireless node pair for mobile wireless communications. The wireless network node can include a mobile node and a ghost-mobile node. The ghost-mobile node can be configured to register the mobile node and allocate resources for communicating with the mobile node according to a predicted future state of the mobile node. Notably, the ghost-mobile node can be instantiated in at least one additional wireless network node proximate to the predicted future location of the mobile node. Additionally, the ghost-mobile node can be configured to predict the future location of the mobile node. The ghost-mobile node also can buffer data packets intended for the mobile node and sent by a correspondent node.

Another aspect of the present invention includes a network node pair that includes a foreign agent and a ghost-foreign agent. The ghost-foreign agent can be configured to provide an advance notification to the mobile node of a presence of a next wireless network node proximate to the predicted future location of the mobile node. In particular, a ghost-foreign agent corresponding to a second foreign agent can make the mobile node aware of the presence of the second foreign agent by signaling an advertisement to the mobile node from a first foreign agent.

Another aspect of the present invention can include a method of mobile communications. The method can include estimating a future location of a mobile node, sending a notification to the mobile node indicating a presence of a next foreign agent proximate to the estimated future location of the mobile node, and registering the next wireless network node as the care-of-address to be used to communicate with the mobile node.

BRIEF DESCRIPTION OF THE DRAWINGS

There are shown in the drawings, embodiments which are presently preferred, it being understood, however, that the invention is not limited to the precise arrangements and instrumentalities shown.

FIG. 2C is a schematic diagram illustrating another exemplary network architecture where a foreign agent is surrounded by a plurality of other foreign agents.

FIG. 3 is a schematic diagram illustrating a message structure that can be assembled for the home agent and/or foreign agent by the ghost-mobile node in accordance with one embodiment of the inventive arrangements disclosed herein.

FIG. 4 is a schematic diagram illustrating a data packet that can be formulated and sent by the ghost-foreign agent in accordance with one embodiment of the inventive arrangements disclosed herein.

DETAILED DESCRIPTION OF THE INVENTION

The present invention provides a system, apparatus, and methods for reducing delays and information losses in a single wireless communication network or interconnection of multiple communication networks. The system, apparatus, and methods of the present invention, more specifically, reduce registration overhead and setup times associated with mobile node handoffs. The system, apparatus, and methods also reduce or eliminate losses due to dropped data packets. The advantageous results are achieved by causing communication network resources to be allocated proactively rather than reactively.

More particularly, the present invention provides a ghost-mobile node and a ghost-foreign agent. The ghost-mobile node can serve as a virtual repeater capable of registering and allocating communication resources by predicting where the mobile node's next handoff will occur as the mobile node moves relative to the communication network's nodes, including those edge nodes that define foreign agents. Time delays and information losses also can be reduced by the ghost-foreign agent. The ghost-foreign advertises the foreign agent's presence in the communication network using a neighboring foreign agent. The ghost-foreign agent can thus make a mobile node aware of a corresponding foreign agent's presence in a communication network before the mobile node actually arrives in the physical region covered by the foreign agent.

Accordingly, the ghost-mobile node and the ghost-foreign agent, operating either individually or jointly, can cause network communication resources to be allocated preemptively rather than passively as in conventional communications networks in which handoffs typically only follow an exchange of setup information following a mobile node's arrival in the physical region covered by the foreign agent. The ghost-mobile node and ghost-foreign agent can also serve to "hide" handoff operations from network layers, thereby hiding operations that would otherwise tend to reduce system performance.

Figure 1:
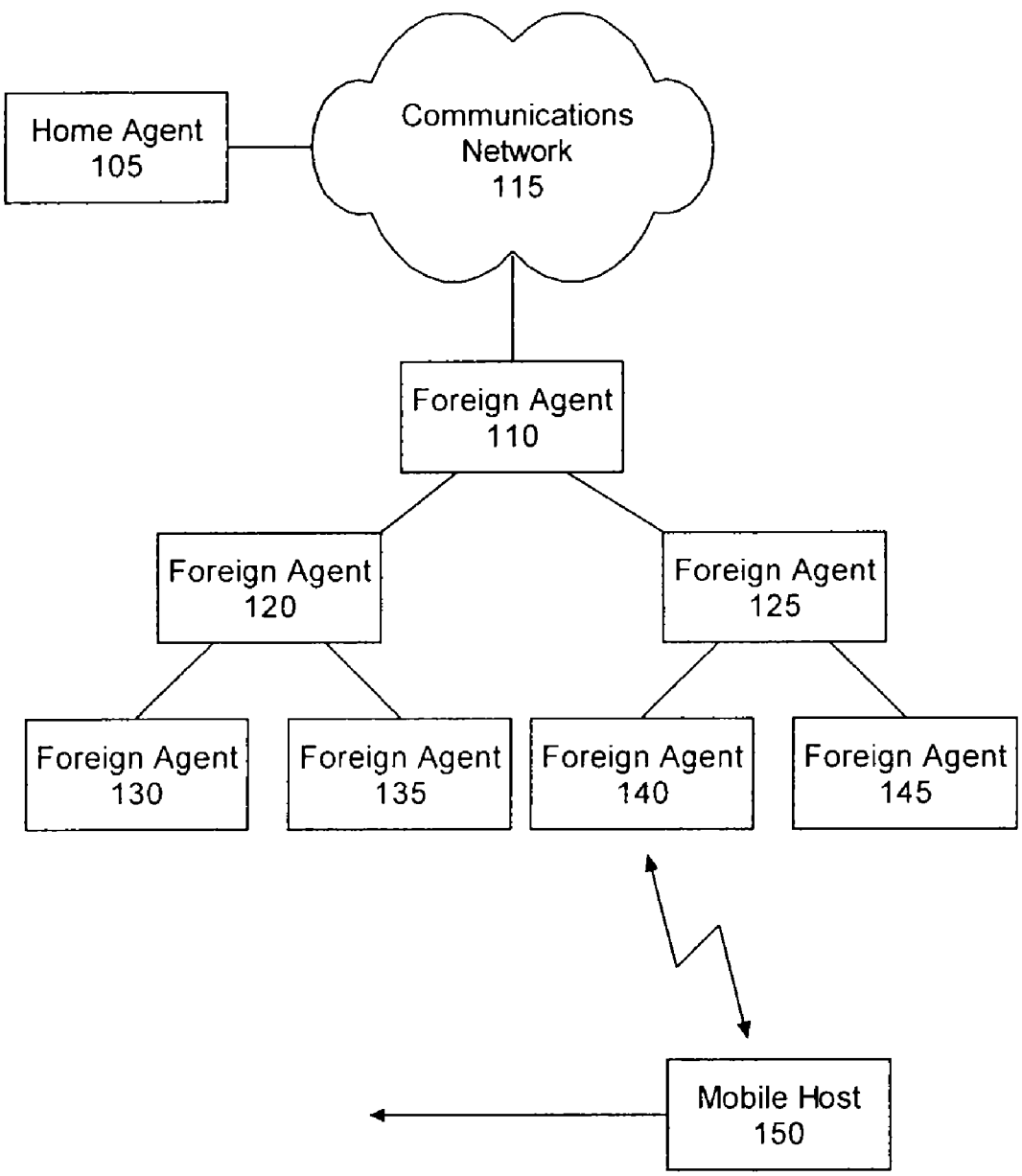
FIG. 1 is a schematic diagram illustrating an exemplary system for mobile communications that incorporates hierarchical foreign agents as known in the art.
Figure 2A:
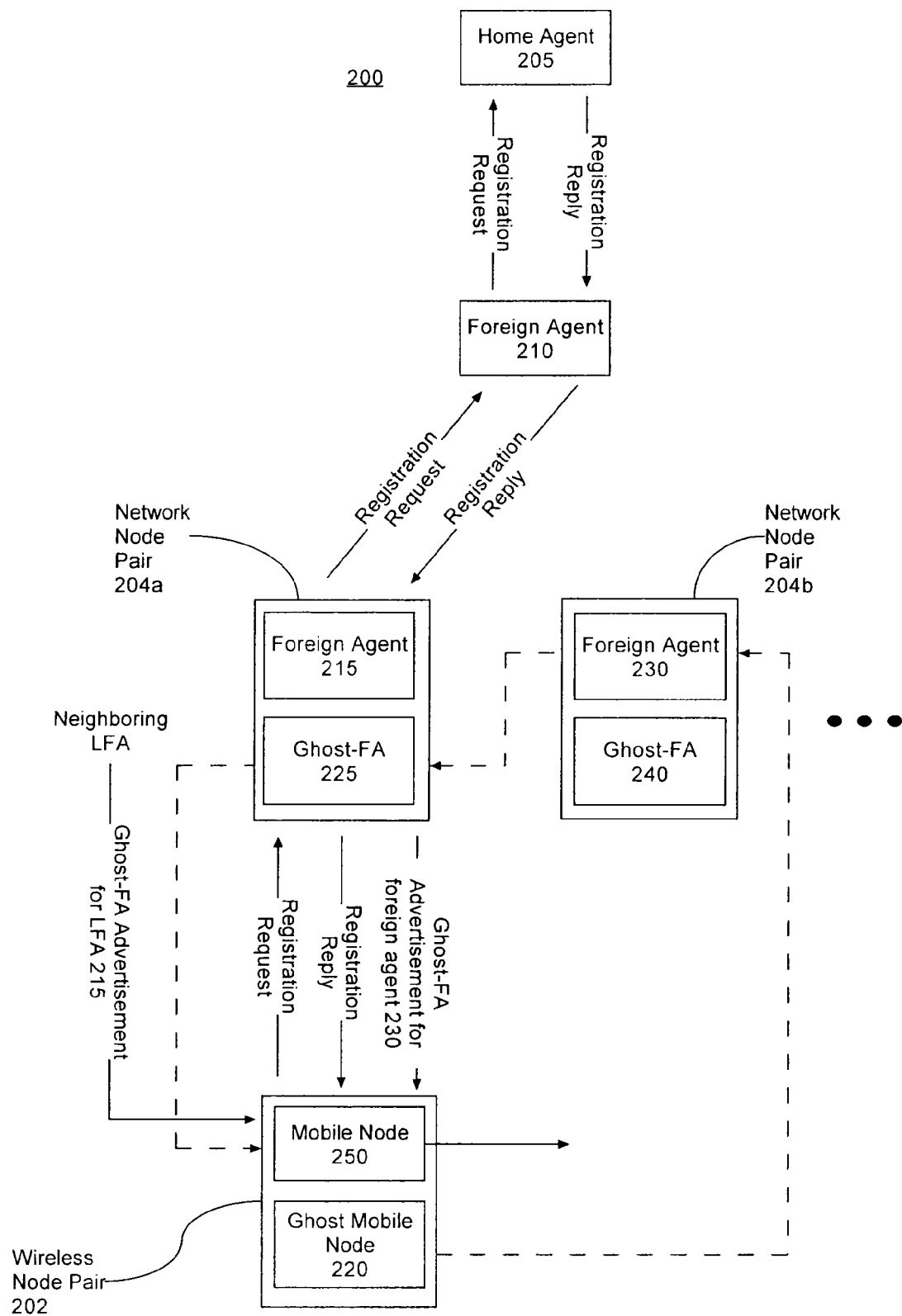
FIGS. 2A and 2B are schematic diagrams illustrating a method of operation for an exemplary system for mobile communications in accordance with the inventive arrangements disclosed herein.
Figure 2B:
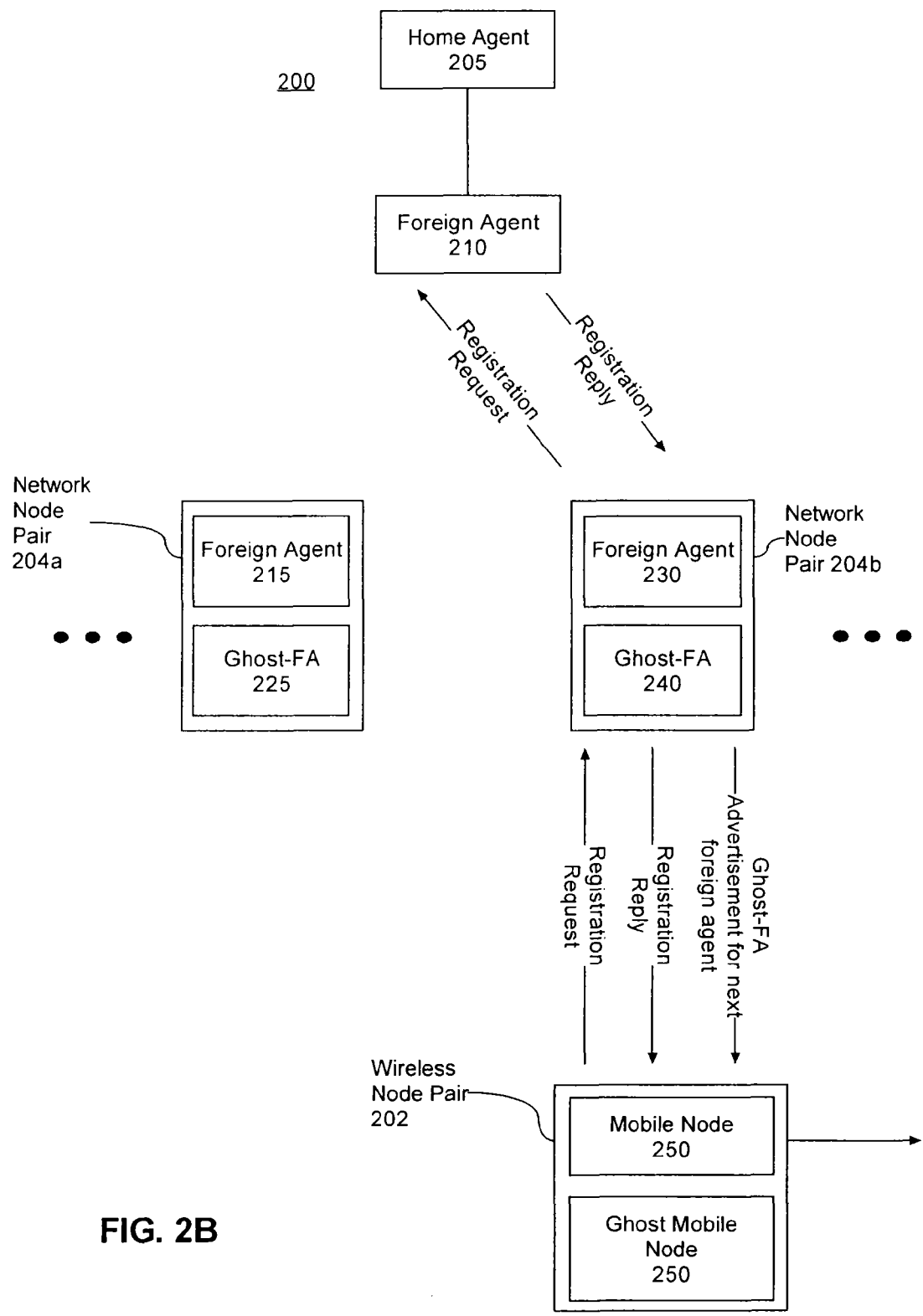

FIGS. 2A and 2B are schematic diagrams illustrating an exemplary interconnection of communication networks 200, including one home and a plurality of foreign networks, that facilitate wireless communication involving at least one mobile host in accordance with the inventive arrangements disclosed herein. As shown in FIGS. 2A and 2B, the interconnected communication networks 200 can include a wireless node pair 202, described in more detail below, as well as two network node pairs 204a, 204b that are also described more fully below. The interconnection of communication networks 200 also illustratively includes a network node that defines a home agent 205 and another network node that defines a foreign agent 210.

Each of the network node pairs 204a, 204b also includes a network node, each defining a foreign agent 215, 230. More particularly, these two foreign agents 215, 230 can be identified as leaf foreign agents to emphasize the hierarchical tree structure of the network nodes, in which the home agent 205 serves as the root, one foreign agent 210 serves as an intermediate branch, and the other two foreign agents serve as leaves. Illustratively, the interconnection of communication networks 200 further includes a mobile node 250.

As will be readily understood by those of ordinary skill in the art, the term node is used herein to denote any addressable device that connects to a communication network and that can recognize, process, or forward data or other communication transmissions. Therefore, each of the network nodes defining the foreign agents 210, 215, 230 can be general purpose computers on which is running specialized routing software, or alternately, application-specific devices such as routers for relaying communication transmissions. Indeed, as will be readily appreciated by those of ordinary skill in the art, the network nodes can be implemented with any information processing systems having the ability to communicate with one another via suitable wired and/or wireless communications links. Moreover, those of ordinary skill in the art will also recognize that the interconnection of networks 200 can include additional foreign agents as needed to create an interconnection of networks of any size and configuration. The interconnection of networks 200 itself can comprise a single network comprising a plurality of interconnected nodes.

The mobile node 250, as part of normal use, changes its point of attachment to the networks forming the interconnection of networks 200. The mobile node 250 can be a computing device having suitable operational software and a wireless transceiver. Accordingly, the mobile node 250 can engage in two-way wireless communications with the communication network edge nodes, defining leaf foreign agents or simply foreign agents 215, 230. The mobile node 250, for example, can be implemented as a standalone portable computing system, or it can be a device embedded within a larger system such as an automobile, a train, or another form of transportation. The mobile node 250 alternately can be, for example, a mobile or laptop computer, a hand-held personal digital assistant (PDA), a cellular phone, or similar device for the wireless exchange of data and/or other communications with the interconnected networks 200.

The home agent 205 is a network node belonging to the network that is designated as the home network. The network is a home network in the sense that it serves as a virtual permanent residence at which the mobile node 250 can receive communications from other network nodes, designated as correspondent nodes. By providing an addressable home, the home agent effectively allows the mobile node 250 to be reachable at its home address even when the mobile node 250 is not attached to the home network. This is done in a manner analogous to the forwarding of mail to an out-of-town resident or call forwarding a telephone communication from a fixed to a mobile number. According to one embodiment of the present invention, the home agent 205 can be implemented as a software component executing on a suitable computing system, such as a server or other computing device. The home agent 205 can be communicatively linked with a network such as the Internet, thereby enabling two-way communications between the home agent 205 and a foreign agent 210.

The foreign agents 210, 215, 230 exist foreign networks in so far as they are part of networks to which the mobile node 250 is communicatively linked when the mobile node 250 is not linked directly with its home network. Even when the mobile node 250 is not directly linked with its home network, though, it can receive communications. These communications are typically in the form of datagrams having an appropriate care-of address, as will be readily understood by those of ordinary skill in the art. Accordingly, the foreign agents 210, 215, 230 assist the mobile node 250 in receiving datagrams delivered to the care-of address.

In order for the network nodes to relay datagrams to the mobile node 250 when the mobile node is in a foreign network, the mobile node must be communicatively linked to a foreign agent 215, 230 corresponding to that particular foreign network. As the mobile node 250 moves from one foreign network to another, a handoff is required from the foreign agent 215 of the foreign network the mobile node is leaving to the foreign agent 230 of the foreign network at which the mobile node is arriving. The handoff typically entails the mobile node 250 signaling the next foreign agent 230, requesting registration. Registration typically precedes an updating of the care-of address and an appropriate reallocation of communication network resources so that communications addressed to the home agent can be properly relayed to the mobile node 250 by "tunneling" messages through a different set of hierarchically arranged network nodes.

As used herein, tunneling refers to the transmission of data intended for use only within a private, such as a corporate, network through a public network wherein the transmission is performed in such a way that the routing nodes in the public network are unaware that the transmission is part of a private network. Tunneling is generally performed by encapsulating the private network data and protocol information within the public network transmission units so that the private network protocol information appears to the public network as data. Tunneling allows the use of the Internet, which is a public network, to convey data on behalf of a private network. Common examples of tunneling techniques can include, but are not limited to, Point-to-Point Tunneling Protocol (PPTP) and generic routing encapsulation (GRE). Still, any of a variety of different tunneling techniques can be used.

Conventional techniques typically require that the mobile node 250 be in the physical region covered by a particular foreign agent 215, 230 in order for the handoff to occur. The processing and updating of relevant information that accompanies the handoff thus exacts a time delay before the mobile node 250 is able to begin communication with the interconnection of networks 200 through the foreign agent of the region in which the mobile node has newly arrived. During the time delay, moreover, any datagrams that arrive from a correspondent node will be dropped because of the temporary lack of a communication link with the mobile node 250.

The present invention overcomes these problems. According to one embodiment of the present invention illustrated in FIGS. 2A and 2B, the wireless node pair 202 includes a ghost-mobile node 220 in addition to the mobile node 250. Although illustratively the ghost-mobile node 220 is adjacent the mobile node 250, it is to be understood that the ghost-mobile node can be a virtual node and need not reside at the same physical location as the mobile node 250. The ghost-mobile node 220, for example, can be set of software instructions running on a device that is remote from the mobile node 250 and that contains a transceiver for communicating with the mobile node.

Regardless of its physical embodiment, the ghost-mobile node 220 operates by signaling a communication network node based upon a predicted future state of the mobile node 250. As illustrated in FIG. 2A, the ghost-mobile node signals 220 an edge node that defines a foreign agent 215, 230. The foreign agent 215 communicatively links the mobile node 250 to a communications network when the mobile node is in a predefined region served by the foreign agent. The ghost-mobile node 220, however, signals the foreign agent before the mobile node arrives in the predefined region based upon the prediction of the mobile node's 250 future state.

The future state can be a physical state such as the location of the mobile node 250, and the prediction can be the time that the mobile node will be in the predefined region served by the foreign agent 215. Accordingly, the predicted future state of the mobile node 250 can based, for example, upon the trajectory of the mobile node or upon its speed. Alternately, the predicted future state of the mobile node 250 can be based upon an estimated location of the mobile node.

According to one embodiment of the present invention, the mobile node pair 202 can further include a Global Positioning System (GPS) unit to facilitate the above-described predictions of the future state of the mobile node 250. Using the GPS unit, location information on the mobile node 250 can be obtained and subsequently used, for example, to estimate which of multiple foreign agents are closest and when the mobile node is likely to arrive in the region served by the closest foreign agent. The ghost-mobile node 220 can perform the function of determining the closest foreign agent.

It be will readily appreciated, that other systems for determining location information can be used and that the present invention is not limited to embodiments using GPS units. Any of various mobile communication techniques employed for mobile telephony can similarly be used, for example. Alternately, for example, the foreign agents 215, 230 can be configured to triangulate the position of the mobile node 250 using signal strength or through the use of wireless sensors. Thus, the mobile node 250 can be configured to notify the foreign agents 215, 230 of its position from time to time or at regular intervals. Alternatively, the foreign agents 215, 230 can be configured to determine the location of the mobile node 250 from time to time or at regular intervals as the case may be.

By continuously and/or periodically determining its position via the GSP unit or other technique, the ghost-mobile node 220 can extrapolate from the current location and predict future locations of the mobile node 250.

Any of a variety of different location prediction techniques can be used by the ghost-mobile node 220. According to one embodiment of the present invention, a Kalman filter is used. The Kalman filter is described generally, for example, in "An Introduction to the Kalman Filter", by Welch G. and Bishop G., University of North Carolina TR 95-041, UNC, Chappell Hill, N.C. (2002). The Kalman filter can be implemented within the ghost-mobile node 220 to determine the amount of time before the ghost-mobile node can send a registration message and act on behalf of the mobile node 250. The Kalman filter addresses the problem of trying to estimate the state $x \in R^n$ of a discrete-time controlled process that is governed by a linear stochastic difference equation. In general, the process is composed of a state vector (Equation 1, below) and measurement vectors (Equation 2, below).

The Kalman filter assumes that there is a state vector x such that:

$$x_k = Ax_{k-1} + Bu_k + w_{k-1} \quad (1)$$

with a measurement vector $z \in R^n$ such that:

$$z_k = Hx_k + v_k \quad (2)$$

The equations also include the values of $w_k$ and $v_k$, which are random variables representing the process noise of the measurement and state vectors. The matrices A, B, and H relate the states and the dynamics of the system under study. In the context of a mobile communication protocol such as Mobile IP, the ghost-mobile node 220 can give the velocity and position of the mobile node 250 at any given time.

The following equation (Equation 3) shows a relationship of the state vector and the basic dynamics of a mobile node with the well-known relationship of a 2-D object moving at constant speed.

$$\begin{pmatrix} x \\ y \\ v_x \\ v_y \end{pmatrix} = \begin{pmatrix} 1 & 0 & t & 0 \\ 0 & 1 & 0 & t \\ 0 & 0 & 1 & 0 \\ 0 & 0 & 0 & 1 \end{pmatrix} \begin{pmatrix} x \\ y \\ v_x \\ v_y \end{pmatrix} + \begin{pmatrix} w_x \\ w_y \\ w_x^s \\ w_y^s \end{pmatrix} \quad (3)$$

The measurement vector $z_k = [x\ y]^T$ can be used in the recursive mechanics of the Kalman Filter. The filter uses an ongoing cycle where time-update equations determine the state ahead of time, and the measurement update is used to adjust the internal parameters of the filter. With these variables, the problem can be posed as a linear Kalman Filter equation:

$$X_k = AX_{k-1} + w_k \quad (4)$$

$$Z_k = Hz_k + v_k \quad (5)$$

where, $$A = \begin{pmatrix} 1 & 0 & t & 0 \\ 0 & 1 & 0 & t \\ 0 & 0 & 1 & 0 \\ 0 & 0 & 0 & 1 \end{pmatrix}; H = \begin{pmatrix} 1 & 0 & 0 & 0 \\ 0 & 1 & 0 & 0 \end{pmatrix} v_k = \begin{pmatrix} v_s \\ v_y \end{pmatrix} w_k = \begin{pmatrix} w_x \\ w_y \\ w_x^s \\ w_y^s \end{pmatrix} \quad (6)$$

The time-update equations for the Kalman Filter are:

$$x_k = Ax_{k-1} + Bu_k + w_{k-1} \quad (7)$$

$$P_k = AP_{k-1}A^T + Q \quad (8)$$

In one scenario B=0 and $P_k$ is the covariance matrix which is estimated from time step k−1 to step k. The matrix $Q = E[w_k w_k^T]$.

For measurement-update equations, the first equation (Equation 9, below) computes the Kalman gain, $K_k$, the second equation (Equation 10, below) calculates the value of $x_k$ which is used in Equation 7 to compute the predicted value of the state vector. The third equation (Equation 11, below) updates the covariance matrix $P_k$. The value of the co-variance matrix $R = E[v_k v_k^T]$ is needed and, in general, is the easier to determine since it is generally known how to measure the position vector. Further, samples can be dedicated to determine the co-variance of $v_k$.

$$K_k = P_k^- H^T (HP_k^- H^T + R)^{-1} \quad (9)$$

$$x_k = x_k^- + K_k(z_k - Hx_k^-) \quad (10)$$

$$P_k = (I - K_k H) P_k^- \quad (11)$$

Using an information processing tool, the values of the matrices R and Q (Equation 12) can be empirically determined to be for, example, $$Q = 0.001 * \begin{pmatrix} 15 & 0 & 0 & 0 \\ 0 & 15 & 0 & 0 \\ 0 & 0 & 1 & 0 \\ 0 & 0 & 0 & 1 \end{pmatrix} \quad (12)$$

$$R = 0.000001 * \begin{pmatrix} 100 & 0 \\ 0 & 0.001 \end{pmatrix}.$$

The following is an example of an algorithm that can be used in the ghost-mobile node to find a closest foreign agent using the measurement vector $z_k = [x\ y]^T$:

```
g-MN (Home Address, HomeAgentAddress)
    while (true) do
        FA FindClosestFA(MN)
        if distance (FA, MN) within threshold then
            HFA FindHighestFA(FA, HomeAgentAddress)
            Register(FA, HomeAddress, HFA)
    end
```

Those of ordinary skill in the art will readily recognize that other techniques beside the Kalman filter can be used by the ghost-mobile node 220 for location prediction. Other techniques for predicting a location of the mobile node 250 include, for example, neural networks, linear prediction mechanisms, and modeling of stochastic processes.

Based upon the predicted future state of the mobile node 250, the ghost-mobile node 220 can determine which foreign agent 210, 215, 230 is likely to serve as the mobile node's next communicative link. For example, a simple look-up database can be maintained by the network listing each foreign agent and its location information. The location can be represented, for example, by a two-element vector, (x, y). The ghost-mobile node 220 can receive updated (x, y) information on the location. Using the updated information, the ghost-mobile node 220 can calculate a distance to the closest foreign agent in the path of the mobile node 250 based upon an estimated speed or trajectory of the mobile node 250.

The ghost-mobile node 220 signals the network communications node that defines the mobile node's 250 next foreign agent 215, 230. The ghost-mobile node 220 signals the foreign agent 215, 230 ahead of the mobile node's 250 arriving in the predefined region served by the foreign agent. The signal from the ghost-mobile node 220 can be a registration request. The signal from the ghost-mobile node 220 can cause an allocation of communications network resources, the resources being those needed for relaying communications between the communications network and the mobile node. Indeed, the signal from the ghost-mobile node 220 can elicit the same response from the network nodes defining the foreign agents 215, 230 as would be elicited were the mobile node 250 physically present in the predefined region covered by the particular foreign agent.

In the context of an IP-based network, the ghost-mobile node 220 can create "spoofed" Universal Datagram Packets (UDP) with the contents of a legitimate mobile node packet. The procedure can utilize raw sockets to construct the message, create all the registration and IP headers, and add the authentication extensions using, for example, the MD5 checksum and a shared key.

As used herein, MD5 refers to an algorithm used to verify data integrity through the creation of a 128-bit message digest from data input, which may be a message of any length. MD5 is intended for use with digital signature applications, which require that large files must be compressed by a secure method before being encrypted with a secret key, under a public key cryptosystem. MD5 is a standard based on the Internet Engineering Task Force (IETF) Request for Comments (RFC) 1321, which is fully incorporated herein by reference. Nonetheless, it will be readily appreciated by those of ordinary skill in the art that other methods of ensuring data security can be used.

Many implementations of Mobile IP include protection against registration replay attacks by adding time-stamps and a "nonce," a random value sent in a communications protocol exchange and frequently used to detect replay attacks. Accordingly, the protocol is able to keep a consistent and secure Location Directory (LD). The nonce is a parameter that varies with time, but also can include a visit counter on a Web page or a special marker intended to limit or prevent the unauthorized replay or reproduction of a file. In any case, as the ghost-mobile node 229 essentially forges registration packets on behalf of the mobile node 250, no time-stamping or nonce numbers need be used. As an alternative, a shared key authentication can be required between the home agent, foreign agents, and the mobile node. Asymmetric authentication as in a protocol such as 802.1X can be used as an alternate to symmetric authentication for delegating authority to the ghost-mobile node 220.

The signal from the ghost-mobile node 220 results in a preemptive setup, one that is effected before the mobile node 250 arrives in the predefined area of coverage of the next foreign agent. The setup can entail all the aspects that occur in the beginning phase of a standard network connection negotiation, including the negotiation of protocol details, communication rates, and error-handling approaches. These are needed to allow the connection to proceed correctly and reliably, but absent the participation of the ghost-mobile node 220 would have to await the arrival of the mobile node 250 in the predefined region covered by the foreign agent 215, 230.

Accordingly, the ghost-mobile node 220 can increase the speed with which handoff occurs, thereby reducing setup delay and avoiding information loses due to the dropping of datagram packets. The ghost-mobile node 220 can replicate the registration request, handle the creation of tunnels, and replicate authentication and authorization information from the mobile node 250, thus acting on behalf of the mobile node 250 before the mobile node is in range of a next foreign agent 215, 230. The ghost-mobile node 220 also can buffer incoming traffic from a correspondent host ring handoff to further insure against the loss of information during a handoff. When the mobile node 250 leaves one foreign agent 215 and moves into the vicinity of the next foreign agent 230, registration will have already taken place and resources will already have been allocated for connecting the mobile node to the communication network.

Referring still to FIGS. 2A and 2B, each of the network node pairs 204a, 204b further includes ghost-foreign agents 225, 240 in addition to network nodes defining foreign agents 215, 230. A ghost-foreign agent 225, 240 transmits an advertisement notifying the mobile node 250 of the existence of a next foreign agent 230, transmitting the advertisement from a foreign agent 215 currently connected with the mobile node 250. That is, the ghost-foreign agent 225 advertises a first foreign agent 230 but does so using a second foreign agent 215. Thus, the advertisement of foreign agent 230 by its ghost-foreign agent 225 is able to reach the mobile node 250 while the mobile node is in the predefined region covered by foreign agent 215. Therefore, the ghost-foreign agent 225 makes the mobile node aware of the foreign agent 230 before it arrives in the predefined region covered by the foreign agent.

A foreign agent 210, 215, 230 typically includes in an advertisement message the vector of care-of addresses. As noted above, the vector of care-of addresses provide an IP address for each of the foreign agent's ancestors, as well as the foreign agent's own IP address. As a mobile node 250 enters a predefined coverage region within the range of communication of a foreign agent 215, the mobile node can submit a registration request to the foreign agent, as described above. The foreign agent 215, in turn, can initiate a registration request to the foreign agent 210, which can forward the registration request to the home agent 205.

The home agent 205 can initiate a tunnel to the foreign agent 210 and transmit a registration reply. The foreign agent 210 can create a tunnel to the foreign agent 215, defining a leaf foreign agent, and forward the registration reply to the foreign agent. The foreign agent 215 then can transmit the registration reply to the mobile node 250. According to one embodiment of the present invention, the ghost-foreign agent 225 acts as an extension of a foreign agent 230 defining a leaf foreign agent. Accordingly, the ghost-foreign agent 225 is able to transmit the advertisement of foreign agent 230 to the mobile node 250 as already described above.

Referring now particularly to FIG. 2B, as the mobile node 250 leaves the first foreign agent 215 and moves toward the next foreign agent 230, the ghost-mobile node 220 can send a registration request to the foreign agent 215. Accordingly, the foreign agent 215 can open a tunnel to the next foreign agent 230 and send a registration reply. As the mobile node 250 enters the communications range of the next foreign agent 230, and as the mobile node 250 has already received the advertisement from the ghost-foreign agent 225, the mobile node 250 can send a registration request to the next foreign agent. The mobile node 250 can then receive a registration reply as the ghost-mobile node 220 has already registered and allocated resources for the mobile node 250.

FIG. 2C is a schematic diagram illustrating another exemplary network architecture where foreign agent 280 is surrounded by foreign agents 260, 265, 270, and 275. If mobility ratio is high, then foreign agent 280 can create instances of a ghost-foreign agent corresponding to foreign agent 280 at foreign agent 260, 265, 270, and/or 275. These instances can represent foreign agent 280 before the mobile node actually reaches the foreign agent within which it is disposed.

Each foreign agent 215, 230 creates ghost-foreign agent instances at the vicinity of other foreign agents. A ghost-foreign agent results in a virtual augmentation of the signal strength of a certain foreign agent, so that the signal strength appears to have increased and the coverage area appears to have been augmented by a certain factor. Indeed, a ghost-foreign agent appears to increase the amount of resources available for facilitating communication among interconnected communication networks.

As already described, a basis of the proactive allocation of communication resources for a stationary or moving mobile node is the virtual instantiation of the ghost-mobile node in at least one additional wireless network node proximate to the predicted future location of the mobile node. So, too, each foreign agent can create its ghost-foreign agent instances or virtual foreign agents around particular thresholds. For example, if foreign agent coverage is denoted as r, a foreign agent can find all foreign agents within k*r, where k is a factor determined according to the expected mobility conditions of the foreign agent. Ghost-foreign agents can thus function as passive repeaters of the operations of the corresponding foreign agent.

FIG. 3 is a schematic diagram illustrating a message structure assembled for the home agent and/or foreign agent from the ghost-mobile node in accordance with one embodiment of the inventive arrangements disclosed herein. The ghost-mobile node includes as the IP source and IP destinations the values of the original home agent's home address and the home agent and/or foreign agent addresses respectively.

The home address and care-of-address are generally known, since the decapsulation process takes place at the foreign agent. For example, the care-of address matches the foreign agent address. The foreign agent address allows the content of the message to be forwarded to the mobile node while the mobile node remains within the foreign network. For hierarchical Mobile IP, the leaf foreign agent address is used as a destination for the registration message. Once the message has reached the foreign agent, the foreign agent forwards the registration packet to a higher foreign agent which forwards it to a still higher foreign agent or on to the home agent, depending upon the wired network infrastructure and the topology of foreign agents. This depends, for example, upon whether the mobile node switches domains with no common foreign agents.

The present invention facilitates the use of any mobile node, while allowing the code for the mobile node to remain unchanged. During the absence of a ghost-mobile node, the mobile node can rely upon reactive mechanisms of the communications protocol in use, whether Mobile IP or another mobile communications protocol. In general, a ghost-mobile node can locate the closest foreign agent in the vicinity of the mobile node. If the distance is within a given threshold, then the highest foreign agent within the hierarchy, that is the home foreign agent, can be located and the mobile node can be registered with that home foreign agent.

FIG. 4 is a schematic diagram illustrating a data packet that can be formulated and sent by the ghost-foreign agent in accordance with one embodiment of the inventive arrangements disclosed herein. The ghost-foreign agent determines all the foreign agents within a ratio (threshold) and creates a packet, for example an Internet Control Message Protocol (ICMP), with the information as shown in FIG. 4. The care-of-addresses are already a persistent part of the foreign agent configuration file and sequence numbers can be spoofed. Additionally, the ghost-foreign agent should assemble the raw socket using the foreign agent address as a source with a broadcast address as destination.

Figure 5:
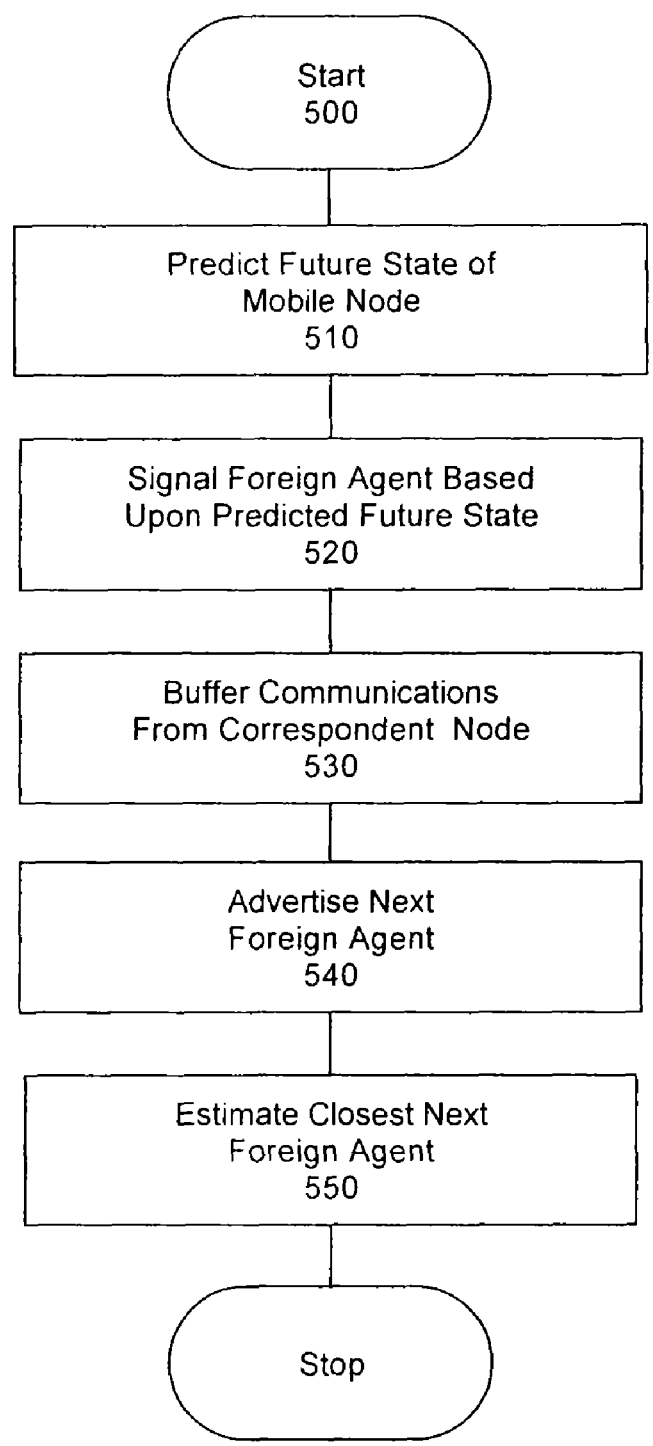
FIG. 5 provides a flowchart illustrative of a method aspect of the invention.

FIG. 5 provides a flowchart of steps illustrative of a method aspect of the invention. The method 500 includes in step 510 predicting a future physical state of the mobile node. In step 520, the method 500 includes signaling the foreign agent based upon the predicted future state of the mobile node. The method 500 optionally includes in step 530 buffering communications communicated to the mobile node from a correspondent node of the communications network.

Optionally, the method 500 further includes in step 540 advertising the foreign agent so that the mobile node is aware of the foreign agent when the mobile node is located outside the predefined region. In step 550, the method 500 also optionally includes estimating which next foreign agent is closest to the mobile node.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for communicating between a mobile node and a communication network; the network having at least one communications network node that is interconnected using a proxy mobile internet protocol (IP), comprising:
   at least one mobile node;
   at least one home agent;
   at least one foreign agent;
   a ghost-foreign agent that advertises messages to one of the mobile nodes indicating presence of the ghost-foreign agent on behalf of one of the foreign agents when the mobile node is located in a geographical area where the foreign agent is not physically present; and
   a ghost-mobile node that creates replica IP messages on behalf of a mobile node, the ghost-mobile node handling signaling required to allocate resources and initiate mobility on behalf of the mobile node, the ghost-mobile node triggering signals based on a predicted physical location of such mobile node or distance with relation to the at least one foreign agent.

2. The system of claim 1, wherein signaling further comprises registration with a replica of the mobile node by the ghost-mobile node to communicate with the foreign agents, triggering tunneling and communication with a mechanism configured to maintain routing information to a mobile node.

3. The system of claim 1, wherein signaling further comprises at least one of a tunnel and a communication network to allocate resources between the mobile node and foreign agent, the signaling being triggered at a threshold distance to one of the foreign agents reported by one of the mobile nodes, the threshold distance reported to one of the foreign agents at least one of a projected trajectory and a speed.

4. The system of claim 1, wherein the at least one ghost-mobile node is a proxy element for the at least one foreign agent and the at least one mobile node, the at least one ghost-mobile node triggering registration based on a distance to a foreign agent by relaying security and shared secrets from a mobile node, and at least one advertisement message from a foreign agent in a vicinity of the ghost-mobile node.

5. The system of claim 1, wherein allocation of resources on behalf of the mobile node is triggered based at least in part on location information, the location information determined by at least one of: a global positioning system (GPS) receiver, a triangulation process, and indirect measurements of location.

6. The system of claim 1, wherein the at least one ghost-foreign agent populates mobile IP Advertisement messages with at least one care-of-address of neighboring foreign agents in order to extend the range of neighboring foreign agents.

7. A method, in a mobile node, for speeding handover, comprising the steps of:

updating, in a mobile node, a location in a ghost mobile node;
determining a distance, in the ghost mobile node in communication with the mobile node, to a closest foreign agent with which the mobile node can complete a handover;
submitting on behalf of the mobile node, from the ghost mobile node, a registration to the foreign agent to which the mobile node is going to complete the handover; and
upon completing the handover, updating a registration in the mobile node.

8. A method, comprising the steps of:
creating, in a network, a plurality of ghost foreign agents corresponding to a foreign agent, the ghost foreign agents configured to replicate mobile advertisements of the foreign agent, the mobile advertisements including at least one of: an IP address of the foreign agent, a care-of-address of the foreign agent, and at least one mobile IP registration, the ghost foreign agents created at a distance surrounding the foreign agent;
detecting, in a mobile node, the foreign agent in the network;
receiving, in the mobile node, an advertisement message corresponding to the foreign agent from one of the ghost foreign agents;
registering, in the mobile node, with the foreign agent through the ghost foreign agent; and
broadcasting advertisement messages from the plurality of ghost foreign agents to the mobile node to extend a reach of the foreign agent, wherein a distance from the mobile node to one of the ghost foreign agents is less than the distance from the mobile node to the foreign agent.

* * * * *